(12) United States Patent
Asher et al.

(10) Patent No.: US 11,316,864 B2
(45) Date of Patent: Apr. 26, 2022

(54) METHOD AND APPARATUS FOR EPHEMERAL ROLES IMPLEMENTING MODULE

(71) Applicant: JPMorgan Chase Bank, N.A., New York, NY (US)

(72) Inventors: Adrian Asher, Jersey City, NJ (US); Michael D. Ackerman, Armonk, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 183 days.

(21) Appl. No.: 16/797,520

(22) Filed: Feb. 21, 2020

(65) Prior Publication Data
US 2020/0287904 A1    Sep. 10, 2020

Related U.S. Application Data

(60) Provisional application No. 62/814,677, filed on Mar. 6, 2019.

(51) Int. Cl.
*G06N 20/00* (2019.01)
*H04L 29/06* (2006.01)
*G06N 5/04* (2006.01)

(52) U.S. Cl.
CPC ........... *H04L 63/102* (2013.01); *G06N 5/04* (2013.01); *G06N 20/00* (2019.01); *H04L 63/104* (2013.01)

(58) Field of Classification Search
None
See application file for complete search history.

(56) References Cited

U.S. PATENT DOCUMENTS

| | | | |
|---|---|---|---|
| 2012/0060207 A1 | 3/2012 | Mardikar et al. | |
| 2014/0196104 A1* | 7/2014 | Chari | H04L 63/20 726/1 |
| 2016/0328576 A1 | 11/2016 | Howley | |
| 2018/0181901 A1* | 6/2018 | Babcock | H04L 67/306 |
| 2019/0012441 A1 | 1/2019 | Tuli et al. | |

OTHER PUBLICATIONS

Official communication (Search Report and Opinion) in W.I.P.O Patent Application No. PCT/US2020/021438, dated Jun. 19, 2020.

* cited by examiner

*Primary Examiner* — Cai Y Chen
(74) *Attorney, Agent, or Firm* — Greenblum & Bernstein, P.L.C.

(57) ABSTRACT

Various methods, apparatuses, and media for implementing a machine-learning model execution module are provided. A processor is configured to generate a machine-learning model. The machine learning model includes data related to a requester's access to one or more ephemeral roles. The processor receives a request from the requester to access the one or more ephemeral roles within the machine-learning model. The processor also determines the requester's group or role membership status within an organization. The processor also dynamically evaluates the received request with the machine learning model in real time to grant or deny access to the one or more ephemeral roles based on the membership status of the requester.

17 Claims, 6 Drawing Sheets

METHOD AND APPARATUS FOR EPHEMERAL ROLES IMPLEMENTING MODULE

CROSS-REFERENCE TO RELATED APPLICATIONS

This application claims the benefit of U.S. Provisional Patent Application Ser. No. 62/814,677 filed Mar. 6, 2019, which is hereby incorporated by reference in its entirety.

TECHNICAL FIELD

This disclosure generally relates to ephemeral roles implementing module, and, more particularly, to methods and apparatuses for implementing a dynamic machine learning model execution module for dynamically granting access to ephemeral roles in real time to significantly reduce processing time of requests received from a computing device.

BACKGROUND

Today, many companies or organizations having a large number of employees face difficulties with roles. For example, the companies or organizations may assign permissions to roles and then persons (e.g., employees) to these roles. A role and a group may be used interchangeably in this context. Then, at least a couple of times a year, the companies or organizations may ask the manager of the person that has access to the role to re-certify that the person still needs it. For example, most companies or organizations may also perform periodic recertification of access to sensitive areas and at this stage a manager of the person that had access to the role may be asked to confirm if the access to the person is still needed. With very large companies, with very large amount of permissions, this may become unwieldy very quickly.

In view of the foregoing, it would be desirable to provide a solution for efficiently processing requests for role access as well as recertification in a very short amount time which overcomes the above-described deficiencies and shortcomings.

SUMMARY

The present disclosure, through one or more of its various aspects, embodiments, and/or specific features or sub-components, provides, inter alia, various systems, servers, devices, methods, media, programs, and platforms for implementing a dynamic machine learning model execution module for dynamically granting access to ephemeral roles in real time to significantly reduce processing time. The various aspects, embodiments, features, and/or sub-components provide optimized processes of implementing a dynamic machine learning model execution module in which the dynamic machine learning model execution module may dynamically determine, in real time, if access to roles should be granted at the time of request, thereby eliminating the conventional need of generating statically assigned set of permissions and eliminating the need of recertification process. Ephemeral roles, according to the context of the exemplary embodiments of the instant disclosure, may mean that there is no statically assigned set of permissions and that determination may be made at the time of request in real time (e.g., within a range of about 100 ms to about 1 s, but the disclosure is not limited thereto) whether to grant access to a role requested by a requester. According to exemplary embodiments, a requester referred to herein could be a human (user) or an application (service) or a combination thereof.

The present disclosure, through one or more of its various aspects, embodiments, features, and/or sub-components provide optimized processes of implementing a dynamic machine learning model execution module in which the machine learning model may be utilized to constantly review access that has happened to determine if the access was appropriate, thereby turning the dynamic machine learning model execution module into a threat detection system as well as an access governance system.

As described herein, various embodiments provide optimized processes for implementing a dynamic machine learning model execution module in which the dynamic machine learning model execution module may automatically perform constant re-validation that the access is valid, thereby removing the need for any periodic human intervention unless the machine learning model execution module determines a discrepancy. According to exemplary embodiments, when the machine learning model execution module determines a discrepancy, it sends a notification for receiving human inputs via a user interface to resolve the discrepancy.

According to an aspect of the present disclosure, a method for implementing a machine learning model execution module for granting access to ephemeral roles is disclosed. The method may include: generating, by a processor, a machine learning model, the machine learning model including data related to a requester's access to one or more ephemeral roles; receiving, by the processor, a request from a requester's computing device to access the one or more ephemeral roles within the machine learning model; determining, by the processor, the requester's group or role membership status within an organization; and dynamically evaluating, by the processor, the received request with the machine learning model in real time to grant or deny access to one or more ephemeral roles based on the membership status of the requester.

According to another aspect of the present disclosure, the method may further include: dynamically updating the machine learning model after granting or denying access to one or more ephemeral roles.

According to yet another aspect of the present disclosure, the method may further include: sending an electronic notification, by the processor, to a manager's computing device, different from the requester's computing device, when access to one or more ephemeral roles has been denied; automatically receiving, by the processor, approval or disapproval from the manager's computing device whether to grant access to one or more ephemeral roles; and updating, by the processor, the machine learning model to incorporate data related to the received approval or disapproval from the manager's computing device.

According to a further aspect of the present disclosure, the method may further include: applying a predefined algorithm to dynamically determine access control at the time of request in real time to grant or deny access to a role requested by the requester.

According to another aspect of the present disclosure, the method may further include: dynamically determining whether access should be granted based on one or more of the following attributes: who created the roles, other's usage of the roles, an organization's reporting lines or project codes or tags, sensitivity of the data being requested, and whether any hints have been provided. According to exemplary embodiments, in dynamically determining whether access should be granted, the machine learning model may be configured to learn exactly which attributes and what weighting are pertinent in access determination. For example, the machine learning model may be configured to determine which attributes and with what weighting the machine learning model will utilize in determining appropriateness of requested access.

According to yet another aspect of the present disclosure, the method may further include: dynamically determining whether access should be granted based on determining whether data requested by the requester conforms with a predefined classification scheme applied on the data.

According to an additional aspect of the present disclosure, the method may further include: dynamically determining whether access should be granted based on contextual identity of a requester.

According to another aspect of the present disclosure, a system for implementing a machine learning model execution module for granting access to ephemeral roles is disclosed. The system may include: a memory; and a processor operatively connected to the memory via a communication network, wherein the processor may be configured to: generate a machine learning model, the machine learning model including data related to a requester's access to one or more ephemeral roles; receive a request from a requester's computing device to access the one or more ephemeral roles within the machine learning model; determine the requester's group or role membership status within an organization; and dynamically evaluate the received request with the machine learning model in real time to grant or deny access to one or more ephemeral roles based on the membership status of the requester.

According to yet another aspect of the present disclosure, the processor may be further configured to: dynamically update the machine learning model after granting or denying access to one or more ephemeral roles.

According to an additional aspect of the present disclosure, the processor may be further configured to: send an electronic notification to a manager's computing device, different from the requester's computing device, when access to one or more ephemeral roles has been denied; automatically receive approval or disapproval from the manager's computing device whether to grant access to one or more ephemeral roles; and update the machine learning model to incorporate data related to the received approval or disapproval from the manager's computing device.

According to a further aspect of the present disclosure, the processor may be further configured to: apply a predefined algorithm to dynamically determine access control at the time of request in real time to grant or deny access to a role requested by the requester.

According to yet another aspect of the present disclosure, the processor may be further configured to: dynamically determine whether access should be granted based on one or more of the following factors: who created the roles, other's usage of the roles, an organization's reporting lines or project codes or tags, sensitivity of the data being requested, and whether any hints have been provided.

According to another aspect of the present disclosure, the processor may be further configured to: dynamically determine whether access should be granted based on determining whether data requested by the requester conforms with a predefined classification scheme applied on the data.

According to yet another aspect of the present disclosure, the processor may be further configured to: dynamically determine whether access should be granted based on contextual identity of a requester.

According to a further aspect of the present disclosure, a non-transitory computer readable medium configured to store instructions for implementing a machine learning model execution module for granting access to ephemeral roles is disclosed. The instructions, when executed, may cause a processor to perform the following: generate a machine learning model, the machine learning model including data related to a requester's access to one or more ephemeral roles; receive a request from a requester's computing device to access the one or more ephemeral roles within the machine learning model; determine the requester's group or role membership status within an organization; and dynamically evaluate the received request with the machine learning model in real time to grant or deny access to one or more ephemeral roles based on the membership status of the requester.

According to yet another aspect of the present disclosure, the instructions, when executed, may cause the processor to further perform the following: dynamically update the machine learning model after granting or denying access to one or more ephemeral roles.

According to a further aspect of the present disclosure, the instructions, when executed, may cause the processor to further perform the following: send an electronic notification to a manager's computing device, different from the requester's computing device, when access to one or more ephemeral roles has been denied; automatically receive approval or disapproval from the manager's computing device whether to grant access to one or more ephemeral roles; and update the machine learning model to incorporate data related to the received approval or disapproval from the manager's computing device.

According to yet another aspect of the present disclosure, the instructions, when executed, may cause the processor to further perform the following: apply a predefined algorithm to dynamically determine access control at the time of request in real time to grant or deny access to a role requested by the requester.

According to another aspect of the present disclosure, the instructions, when executed, may cause the processor to further perform the following: dynamically determine whether access should be granted based on one or more of the following factors: who created the roles, other's usage of the roles, an organization's reporting lines or project codes or tags, sensitivity of the data being requested, and whether any hints have been provided.

According to yet another aspect of the present disclosure, the instructions, when executed, may cause the processor to further perform the following: dynamically determine whether access should be granted based on determining whether data requested by the requester conforms with a predefined classification scheme applied on the data.

According to yet another aspect of the present disclosure, the instructions, when executed, may cause the processor to further perform the following: dynamically determine whether access should be granted based on contextual identity of a requester.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
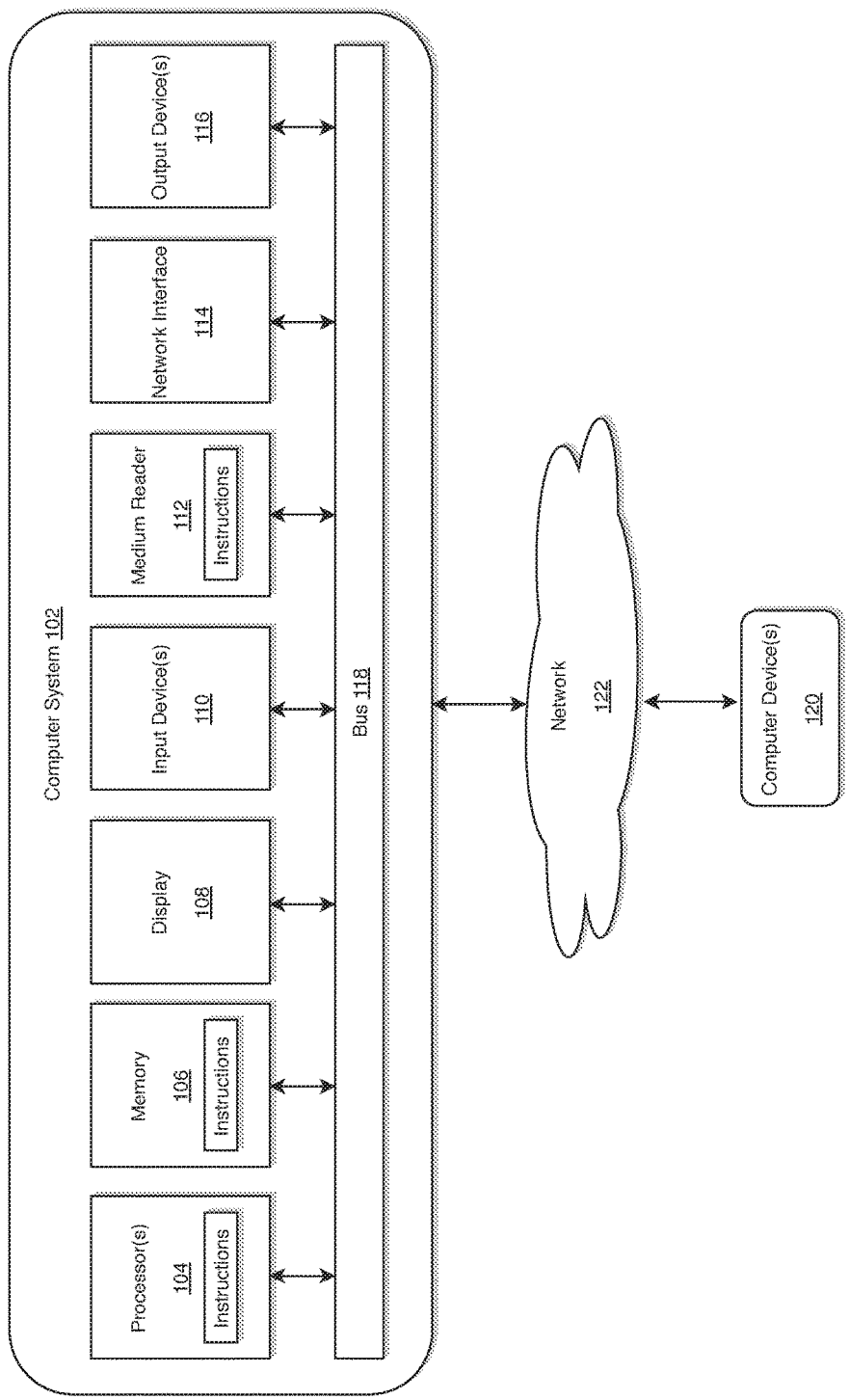
FIG. 1 illustrates a computer system for implementing a dynamic machine learning model execution module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes for implementing a dynamic machine learning model execution module in which the dynamic machine learning model execution module may dynamically determine, in real time, if access to roles should be granted at the time of request, thereby eliminating the conventional need of generating statically assigned set of permissions and eliminating the need of recertification processes. For example, conventionally, organizations manually have their staff review access to determine if appropriate. However, as described herein, various embodiments provide optimized processes for implementing a dynamic machine learning model execution module in which the dynamic machine learning model execution module may automatically perform constant re-validation that the access is valid, thereby removing the need for any periodic human intervention unless the machine learning model execution module determines a discrepancy. According to exemplary embodiments, when the machine learning model execution module determines a discrepancy, it sends a notification for receiving human inputs via a user interface to resolve the discrepancy.

Figure 2:
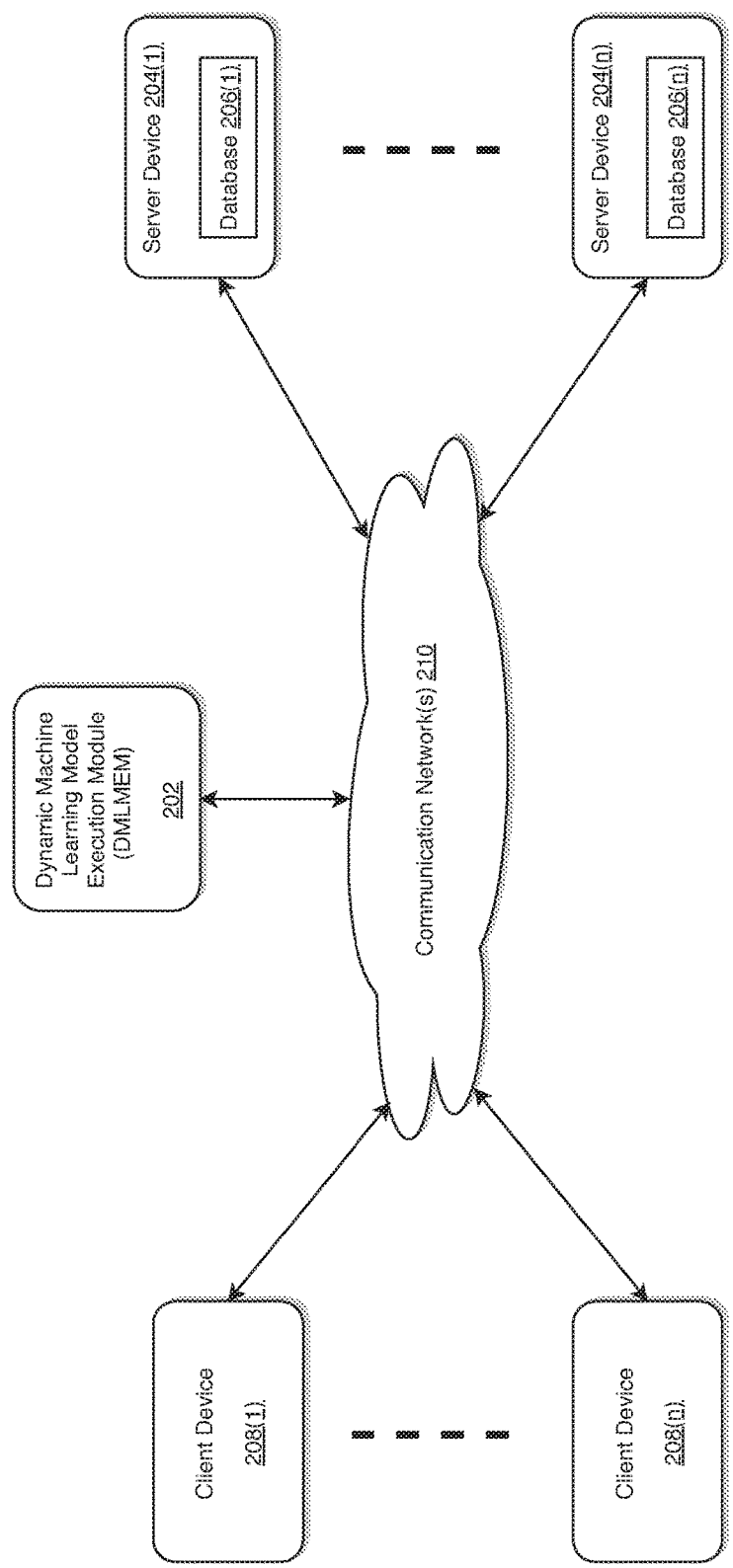
FIG. 2 illustrates an exemplary diagram of a network environment with a dynamic machine learning model execution module in accordance with an exemplary embodiment.

Referring to FIG. 2, a schematic of an exemplary network environment 200 for optimized processes of implementing a dynamic machine learning model execution module, in which the dynamic machine learning model execution module may dynamically determine, in real time, if access to roles should be granted at the time of request.

According to exemplary embodiments, significant reduction of processing time to process access requests to access roles may be facilitated by implementing a dynamic machine learning model execution module (DMLMEM) 202 as illustrated in FIG. 2. The DMLMEM 202 may be the same or similar to the computer system 102 as described with respect to FIG. 1. The DMLMEM 202 may store one or more applications that can include executable instructions that, when executed by the DMLMEM 202, cause the DMLMEM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DMLMEM 202 itself, may be located in virtual server(s) running in a cloud-based computing environment rather than being tied to one or more specific physical network computing devices. Also, the application(s) may be running in one or more virtual machines (VMs) executing on the DMLMEM 202. Additionally, in one or more embodiments of this technology, virtual machine(s) running on the DMLMEM 202 may be managed or supervised by a hypervisor.

In the network environment 200 of FIG. 2, the DMLMEM 202 is coupled to a plurality of server devices 204(1)-204(n) that hosts a plurality of databases 206(1)-206(n), and also to a plurality of client devices 208(1)-208(n) via communication network(s) 210. A communication interface of the DMLMEM 202, such as the network interface 114 of the computer system 102 of FIG. 1, operatively couples and communicates between the DMLMEM 202, the server devices 204(1)-204(n), and/or the client devices 208(1)-208(n), which are all coupled together by the communication network(s) 210, but the disclosure is not limited thereto. For example, other types and/or numbers of communication networks or systems with other types and/or numbers of connections and/or configurations to other devices and/or elements may also be used. According to exemplary embodiments, when service to be consumed, in the network environment 200 of FIG. 2, the DMLMEM 202 may be coupled to various APIs, datastores, databases, or any service that may require entitlement.

The communication network(s) 210 may be the same or similar to the network 122 as described with respect to FIG. 1, although the DMLMEM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DMLMEMs that efficiently combine multiple client side to server connections from the same browser into a single connection per browser to improve network communication and reduce power consumption.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DMLMEM 202 may be a standalone device or integrated with one or more other devices or apparatuses, such as one or more of the server devices 204(1)-204(n), for example. In one particular example, the DMLMEM 202 may include or be hosted by one of the server devices 204(1)-204(n), and other arrangements are also possible. Moreover, one or more of the devices of the DMLMEM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DMLMEM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DMLMEM 202 that may efficiently optimize processes for significantly reducing processing of time granting access to roles requests as well as eliminating the need recertification of certain roles. The client devices 208(1)-208(n) may be mobile computing devices, desktop computing devices, laptop computing devices, tablet computing devices, virtual machines (including cloud-based computers), or the like, that may execute host chat operation, e-mail operation, or voice-to-text applications, for example.

The client devices 208(1)-208(n) may run interface applications, such as standard web browsers or standalone client applications, which may provide an interface to communicate with the DMLMEM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DMLMEM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DMLMEM 202, the server devices 204(1)-204(n), or the client devices 208(1)-208(n), for example, may be configured to operate as virtual instances on the same physical machine. For example, one or more of the DMLMEM 202, the server devices 204(1)-204(n), or the client devices 208(1)-208(n) may operate on the same physical device rather than as separate devices communicating through communication network(s) 210. Additionally, there may be more or fewer DMLMEMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks. Packet Data Networks (PDNs), the Internet, intranets, and combinations thereof.

Figure 3:
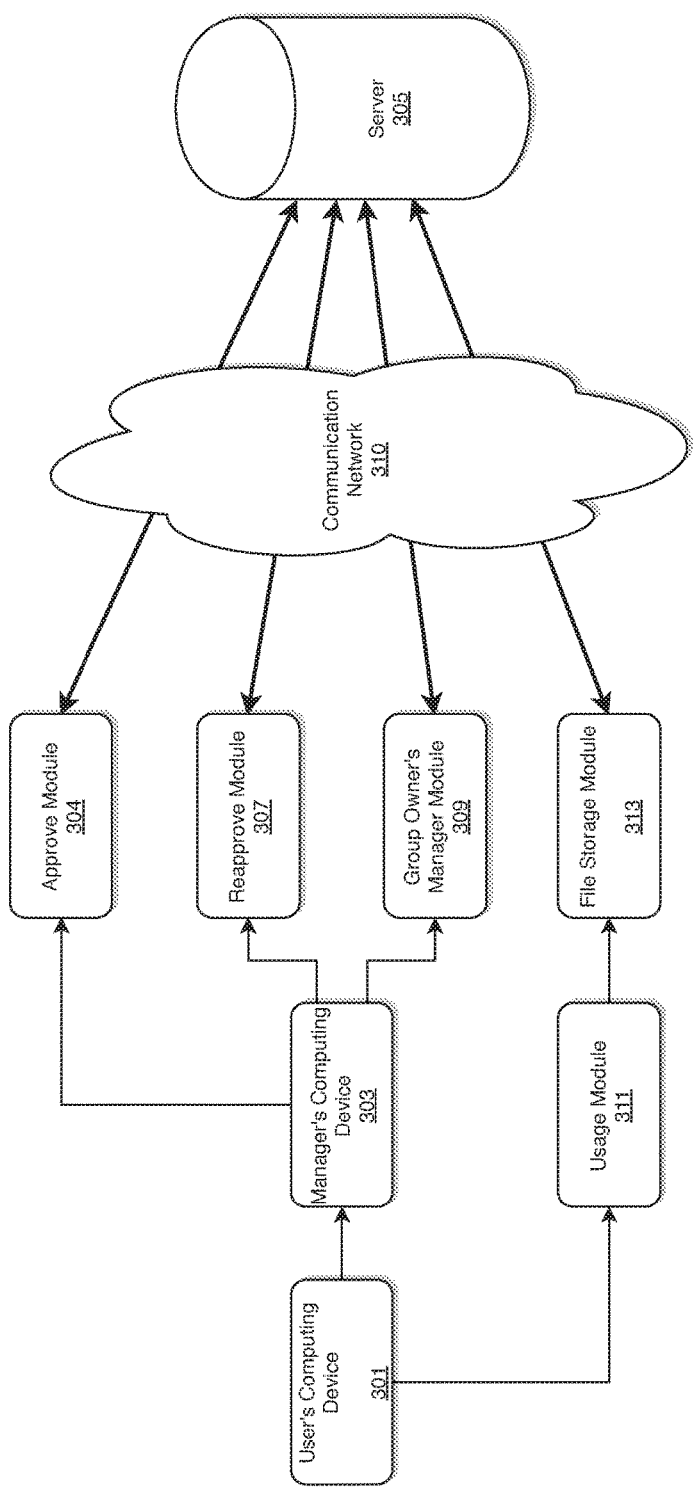
FIG. 3 illustrates an exemplary block diagram of conventional system without a dynamic machine learning model execution module.

FIG. 3 illustrates an exemplary block diagram of a conventional system illustrating a computing device without a dynamic machine learning model execution module. As depicted in FIG. 3, the system 300 may include a computing device 301 that may be coupled to a server 305 via a communication network 310. According to exemplary embodiments, the communication network 310 may be the communication network 210 as disclosed above with reference to FIG. 2. In order to access information accessible from the server 305, one or more browser applications (browsers) may run on the computing device 301. Browsers may be configured to run within a local operating system of the computing device 301.

As illustrated in FIG. 3, the conventional system 300 may include a user's computing device 301, a manager's computing device 303, an approve module 304, a server 305, a reapprove module 307, a group owner's manager module 309, a file storage module 313, a usage module 311, and a communication network 310.

Typically, on joining organization or when new permissions to access roles are requested by a user utilizing the user's computing device 301, such requests (e.g., via manual ticket requests) are received by a manager's computing device 303. The manager's computing device 303 may be utilized by a manager or supervisor of the user. The manager or the supervisor may manually review the request and send his/her decision, via the computing device 303, on approval or disapproval of accessing roles by the user to be stored in the approve module 304. Often, in addition to the manager's approval, an owner/group owner of the roles may also have to approve or disapprove the access request and store such decision into the approve module 304. Upon approval, the user may access the role by utilizing the usage module 311 and the file storage module 313 via the communication network 310 and the server 305.

According to conventional system 300 as illustrated in FIG. 3, to make sure that permissions to access roles are kept to a minimum there may be a regular recertification cycle that may occur to ensure that access to roles may only be provisioned to what is still needed. For example, during recertification cycle, the user's computing device 301 may send a request to the manager's computing device 303 that the user still needs access to the roles. The manager's computing device 303 reapproves the request and sends a notification that the user has been reapproved to access the roles to the reapprove module 307. This manual process may take at least few minutes for each person (e.g., manager of the user) to review which may amount to a waste of a huge amount of time for a large organization where the manager has to approve a large number of users within the organization. Further, when a user moves or leaves the organization, any groups/roles that the user owned must be transferred to someone. The manager of the user who is leaving may be asked, via the group owner's manager module 309, who should be assigned to the groups/roles that the leaving user owned. This manual process also may take a huge amount of waste time. If the manager of the user who is leaving does not determine who should be assigned to the groups/roles that the leaving user owned, by default, the manager of leaving user may become owner of such groups/roles. This problem may be perpetuated when the manager of the leaving user then leaves the organization and the manager's manager may end up owning the groups/roles. Eventually the chief executive officer (CEO) would own all group/roles. This creates an unnecessary complexity in approving or disapproving requests to access roles and may become unwieldy very quickly.

The various aspects, embodiments, features, and/or subcomponents of the instant disclosure provide optimized processes of implementing a dynamic machine learning model execution module in which the dynamic machine learning model execution module may dynamically determine, in real time, if access to roles should be granted at the time of request, thereby eliminating the conventional need of generating statically assigned set of permissions and eliminating the need of recertification process.

According to conventional system 300 as illustrated with respect to FIG. 3, roles may be static. A static role may only be occasionally updated, for example, through a manual ticket request from a human (a user), or may be through an automated removal for lack of usage of a role by the user. As described above by referring to FIG. 3, most organization may also perform periodic recertification of access to sensitive areas which requires manual reconfirmation by a manager of the user whether such access may still be needed.

Figure 4:
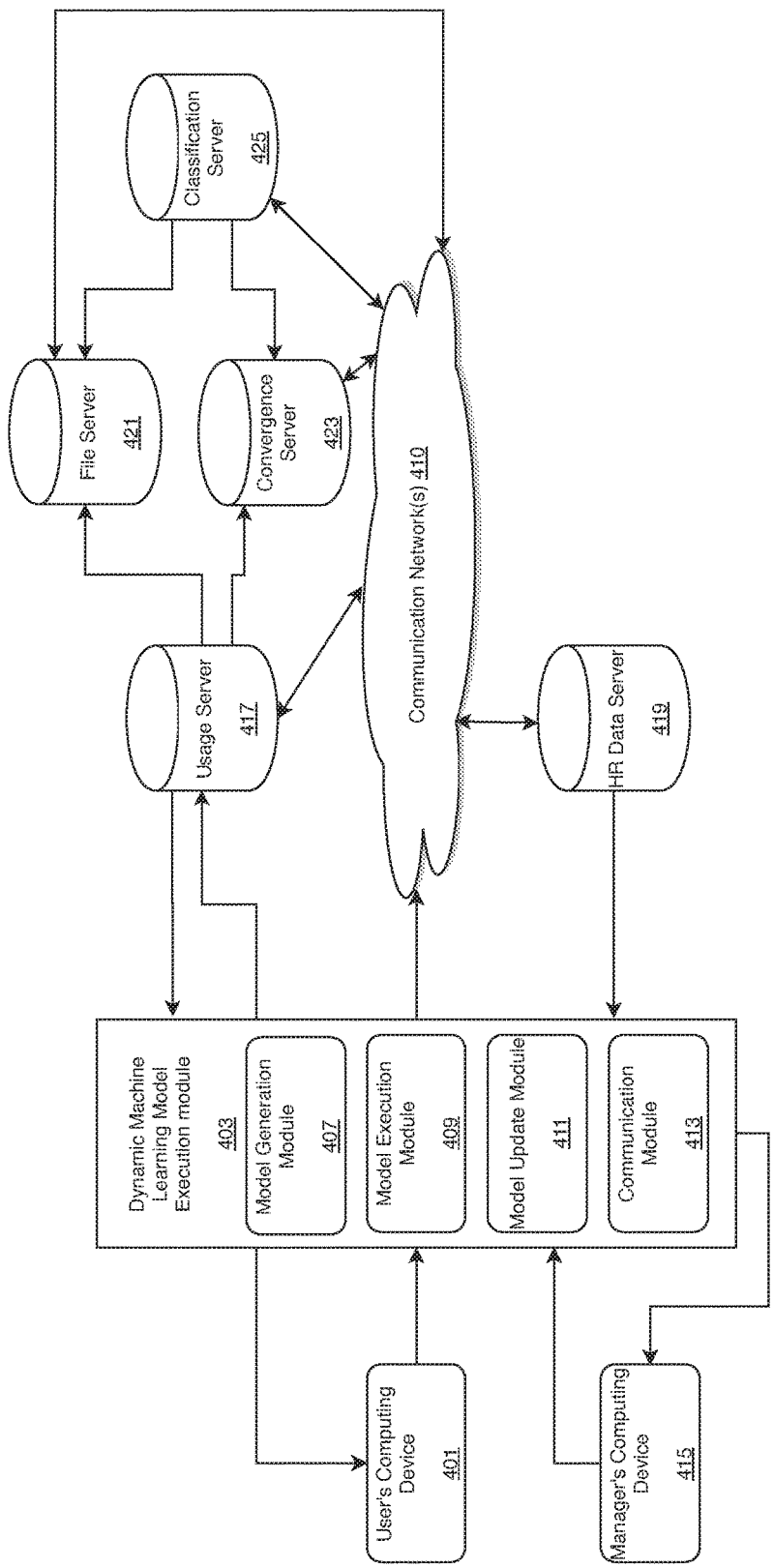
FIG. 4 illustrates an exemplary block diagram of a system with a dynamic machine learning model execution module in accordance with an exemplary embodiment.

Contrary to conventional system, according to exemplary embodiments, by utilizing the DMLMEM 202 of the instant disclosure, decision may be granted dynamically in real time (e.g., near real time) to access roles (dynamic roles). According to exemplary embodiments, based on individual usage (e.g., the requester of the computing device 401 as illustrated in FIG. 4) or the usage of the other requesters deemed to be in the same cluster/group, access to roles is provided (or removed) dynamically in real time. According to exemplary embodiments, a requester referred to herein could be a human (user) or an application (service) or a combination thereof. According to exemplary embodiments, within the context of the instant disclosure, a user may also be referred to as an application.

FIG. 4 illustrates an exemplary block diagram of a system with a dynamic machine learning model execution module in accordance with an exemplary embodiment.

As illustrated in FIG. 4, the system 400 may include a requester's computing device 401 that may be coupled to a dynamic machine learning model execution module (DMLMEM) 403 and one or more servers via a communication network 410. The DMLMEM 403 may also be coupled to a manager's computing device 415. In the context of the instant disclosure, a requester's computing device 401 may be utilized by a requester and the manager's computing device 415 may be utilized by a manager or supervisor of the requester. The communication network 410 may be the communication network 210 as disclosed herein with reference to FIG. 2. Unlike the conventional systems, the requester's computing device 401 and the manger's computing device 415 of the instant disclosure may be configured to implement a DMLMEM 403 that may dynamically grant or deny access to roles in real time (e.g., within 100 ms), thereby eliminating the conventional need of generating statically assigned set of permissions and eliminating the conventional need of recertification processes.

According to exemplary embodiments, the DMLMEM 403 may be configured to automatically perform constant re-validation that the access is valid, thereby removing the need for any periodic human intervention unless the DMLMEM 403 determines a discrepancy. According to exemplary embodiments, when the DMLMEM 403 determines a discrepancy, it sends a notification for receiving human inputs via a user interface embedded within the user's computing device 401 or the manager's computing device 415 to resolve the discrepancy. According to exemplary embodiments, approval to resolve discrepancies may be provided by the manager of the requester, or the owner of a target (database/service), or both. According to exemplary embodiments, similar approve module 303, as illustrated in FIG. 3, may be embedded within the user's computing device 401, the manager's computing device, and/or a target (database/service) computing device, and such approve module may be utilized to approve the discrepancies.

According to exemplary embodiments, DMLMEM 403 may include a model generation module 407, a model execution module 409, a model update module 411, and a communication module 413. According to exemplary embodiments, each of the model generation module 407, the model execution module 409, the model update module 411, and the communication module 413 may be implemented by microprocessors or similar, and may be programmed using software (e.g., microcode) to perform various functions discussed herein and may optionally be driven by firmware and/or software. Alternatively, each of the model generation module 407, the model execution module 409, the model update module 411, and the communication module 413 may be implemented by dedicated hardware, or as a combination of dedicated hardware to perform some functions and a processor (e.g., one or more programmed microprocessors and associated circuitry) to perform other functions.

According to exemplary embodiments, the model generation module 407 may generate a machine learning model. The machine learning model may include data related to a requester's access to one or more ephemeral roles. Ephemeral roles, according to the context of the exemplary embodiments of the instant disclosure, may mean that there is no statically assigned set of permissions and that determination may be made at the time of request by a requester of the requester's computing device 401 in real time (e.g., within a range of about 100 ms to about 1 s, but the disclosure is not limited thereto) whether to grant access to a role requested by the requester.

The DMLMEM 403 may receive a request from the requester to access the one or more ephemeral roles within the machine learning model. The model execution module 409 may determine the requester's group or role membership status within an organization; and may dynamically evaluate the received request with the machine learning model in real time to grant or deny access to one or more ephemeral roles based on the membership status. The communication module 413 may be utilized to establish communication between the DMLMEM 403 and the communication network 410 and each of the usage server 417, the human resource (HR) data server 419, the file server 421, the classification server 425, and the convergence server 423, but the disclosure is not limited thereto. For example, according to exemplary embodiments, the machine learning model generated by the model generation module 407 can consume attributes about both the requester (user or application) and the target (e.g., database/service) from many other sources applicable to corporate environment, current target's operating state, organizational threat status, or other input to the model about the current operating threat environment.

According to exemplary embodiments, the model update module 411 dynamically updates in real time the machine learning model generated by the model generation module 407 after granting or denying access to one or more ephemeral roles executed by the model execution module 409. According to exemplary embodiments, in a learning mode, the DMLMEM 403 may be utilized as a recommendations engine to suggest appropriateness for requested access until it is determined that the accuracy in granting or denying requested access by the machine learning model generated by the model generation module 407 is sufficiently high compared to manual determination. According to exemplary embodiments, what is sufficiently high may be determined based on an organization's risk tolerance.

According to exemplary embodiments, the DMLMEM 403 may send an electronic notification via the communication module 413 to the manager's computing device 415 when an access to one or more ephemeral roles has been denied by the model execution module 409. According to exemplary embodiments, the electronic notification may be in the form an e-mail, SMS, pop-up message, push notification, etc., but the disclosure is not limited thereto.

The DMLMEM 403 may automatically receive via the communication module 413 approval or disapproval from a manager who is utilizing the manager's computing device 415 whether to grant access to one or more ephemeral roles. The model update module 411 may update the machine learning model generated by the model generation module 407 to incorporate data related to manager's approval or disapproval. The updated model may be stored in the usage server 417. The usage server 417 may access data related to the requester from file server 421 and the convergence server 423. The classification server 425 may include data related to what label has been applied to files that include requester information data and data related to what label has been applied to page that include requester information data. The file server 421 may access data related to what label has been applied to files that include requester information data from the classification server 425. The confluence server 423 may access data related to what label has been applied to page that include requester information data from the classification server 425. The HR data server 419 may store sensitive data, for example, data related to the requester's employment status, salary, security clearance to a particular role, etc.

According to exemplary embodiments, the DMLMEM 403 may determine whether access should be granted to access the roles by dynamically evaluating in real time all data from the usage server 417, the HR data server 419, the file server 421, the convergence server 423, and the classification server 425. The dynamic determination in real time by the DMLMEM 403 may be based on one or more of the following factors: who created the roles, other's usage of the roles, organization reporting lines or project codes or tags, the sensitivity of the data, and whether any hints have been provided.

According to exemplary embodiments, when the DMLMEM 403 determines that the machine learning model does not have sufficient information to determine access control, the DMLMEM 403 may electronically send notifications to several computing devices to send hints to the DMLMEM 403 regarding a particular access request scenario and receives inputs via the computing devices additional data regarding the hints to make a final determination on access control. According to exemplary embodiments, the DMLMEM 403 may not execute the hints received from the computing devices when it determines that the machine learning model does not have sufficient data to make final determination on access control. Rather, the DMLMEM 403 send electronic notification to a requester's computing device that the DMLMEM 403 is not able to automatically determine approval or disapproval of an access request to ephemeral roles, and that it requires a human requester's inputs to determine approval or disapproval of the access request.

According to exemplary embodiments, the following may include specific examples (e.g., specific events) when the model update module 411 updates or modify models generated by the model generation module 407: when a requester changes job, or changes department within the same organization (all their previous access should be removed and new access should be provisioned based on the new clusters they will be part of); a developer gets to a new project (now they have a need to be able to write code for another application. Access to the code repository to commit code (write as opposed to just read) needs to be granted); a new project is created as part of a section of the organization, e.g., investment banking (all investment banking requesters and the groups executive should be able to access this new section of the organization); a new initiative is created by HR for training for all people that are vice president (VP). All VPs should be able to have access to this new initiative); data that was previously classified as restricted is now classified as highly restricted (restricted data could have been seen by all employees, but highly restricted needs extra permissions).

According to exemplary embodiments, the DMLMEM 403 of the instant disclosure may also grant or deny access to roles based on contextual identity of a requester. For example, contextual identity may be related to the concept of there being only one requester, but the requester should have differing levels of access dependent upon which environment (e.g., context) the requester is operating in. Thus, when the requester is operating from his office desk, the requester should have certain levels of access. Whereas, when the requester is operating from home computer connected through a VPN may have another levels of access. For example, the requester now on notice for leaving the organization and suddenly the requester starts accessing every lead in a sales database. The requester's context may now no longer be that of a fully trusted employee. The DMLMEM 403 of the instant disclosure is configured to dynamically determine these activities of the requester and may grant or deny access to roles based on contextual identity of the requester as disclosed above in real time.

According to exemplary embodiments, there may be no need for recertification of requester's access to roles. For example, every time something changes, be it a new project added to a person or a new piece of data is classified (or re-classified), the DMLMEM 403 of the instant disclosure may dynamically determine who should have access (and by extension who should not).

According to exemplary embodiments, the DMLMEM 403 of the instant disclosure may also apply a predefined algorithm to dynamically determine access control at the time of request in real time to grant or deny access to a role requested by the requester.

According to exemplary embodiments, the DMLMEM 403 of the instant disclosure may also dynamically determine, in real time, whether access should be granted based on determining whether data requested by the requester conforms with a predefined classification scheme applied on the data. According to exemplary embodiments, the predefined classification scheme may include rules to classify a data based on determining whether data requested was already in the public domain or whether the data is highly classified which may require access by only authorized persons within an organization. According to exemplary embodiments, the predefined classification scheme may also include various levels of classification corresponding to requester's level of access to the data. For example, one requester may have a lower level access which may allow the requester to access only unclassified/non-sensitive data whereas another requester may have a higher level access which may allow the requester to access both classified/sensitive data and unclassified/non-sensitive data.

According to exemplary embodiments, a non-transitory computer readable medium may be configured to store instructions for implementing the DMLMEM 403 for granting access to ephemeral roles. According to exemplary embodiments, the instructions, when executed, may cause a processor embedded within the DMLMEM 403 to perform the following: generating a machine learning model, the machine learning model includes data related to a requester's access to one or more ephemeral roles; receiving a request from a requester's computing device to access the one or more ephemeral roles within the machine learning model; determining the requester's group or role membership status within an organization; and dynamically evaluating the received request with the machine learning model in real time to grant or deny access to one or more ephemeral roles based on the membership status of the requester. The processor may be the same or similar to the processor 104 as illustrated in FIG. 1 or a processor embedded within the fraud prevention application module 202 as illustrated in FIG. 2 or a processor embedded within the DMLMEM 403 as illustrated in FIG. 4.

According to exemplary embodiments, the instructions, when executed, may further cause the processor 104 to dynamically update, in real time, the machine learning model after granting or denying access to one or more ephemeral roles.

According to exemplary embodiments, the instructions, when executed, may further cause the processor 104 to perform the following: sending an electronic notification to a manager's computing device, different from the requester's computing device, when access to one or more ephemeral roles has been denied; automatically receiving approval or disapproval from the manager's computing device whether to grant access to one or more ephemeral roles; and updating the machine learning model, in real time, to incorporate data related to the received approval or disapproval from the manager's computing device, but the disclosure is not limited thereto.

According to exemplary embodiments, the instructions, when executed, may further cause the processor 104 to apply a predefined algorithm to dynamically determine access control at the time of request in real time to grant or deny access to a role requested by the requester, but the disclosure is not limited thereto.

According to exemplary embodiments, the instructions, when executed, may further cause the processor 104 to dynamically determine, in real time, whether access should be granted based on one or more of the following factors: who created the roles, other's usage of the roles, an organization's reporting lines or project codes or tags, sensitivity of the data being requested, and whether any hints have been provided, but the disclosure is not limited thereto.

According to exemplary embodiments, the instructions, when executed, may further cause the processor 104 to dynamically determine, in real time, whether access should be granted based on determining whether data requested by the requester conforms with a predefined classification scheme applied on the data, but the disclosure is not limited thereto.

According to exemplary embodiments, the instructions, when executed, may further cause the processor 104 to dynamically determine, in real time, whether access should be granted based on contextual identity of a requester, but the disclosure is not limited thereto.

Figure 5:
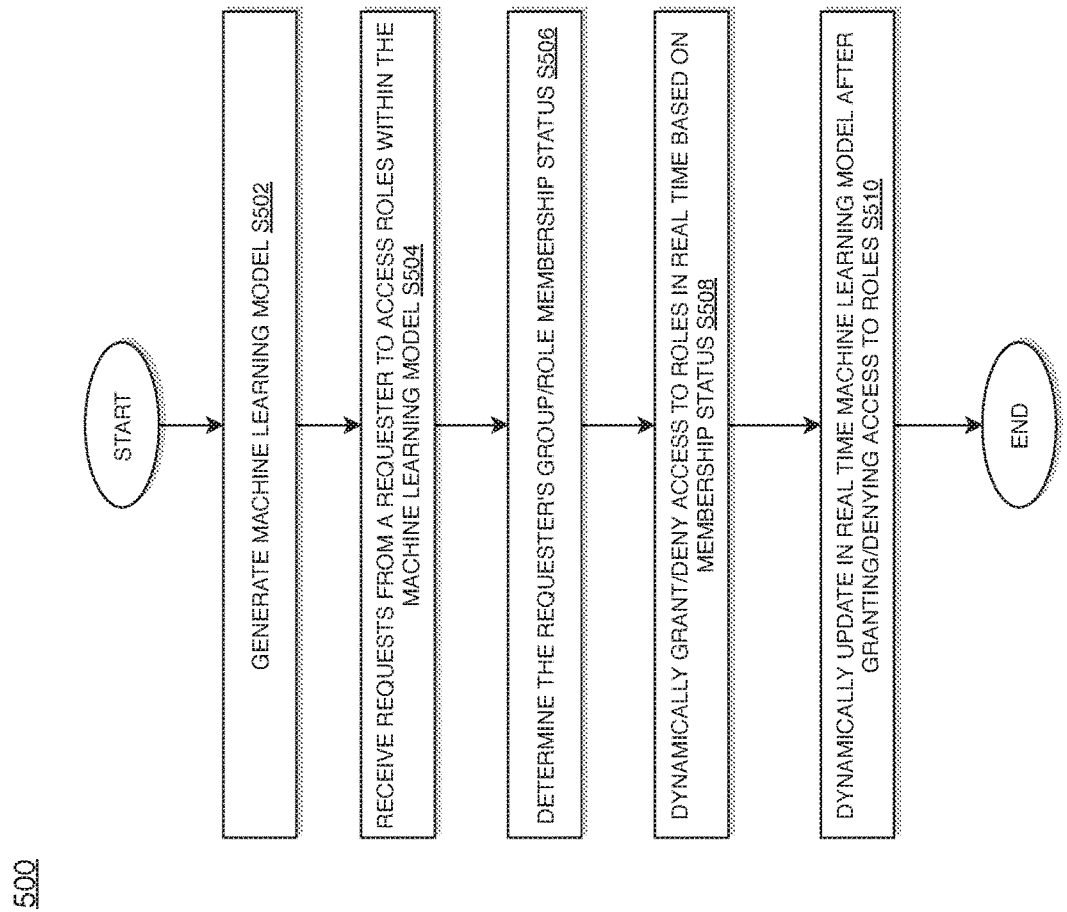
FIG. 5 illustrates a flowchart of an exemplary process for implementing a dynamic machine learning model execution module in accordance with an exemplary embodiment.

FIG. 5 illustrates a flowchart of an exemplary process for implementing a dynamic machine learning model execution module in accordance with an exemplary embodiment. The dynamic machine learning model execution module may be the DMLMEM 202 as illustrated in FIG. 2 or the DMLMEM 403 as illustrated in FIG. 4.

In the process 500 of FIG. 5, a machine learning model may be generated by a model generation module at step S502. The machine learning model may include data related to a requester's access to one or more ephemeral roles.

At step S504, the DMLMEM 403 may receive a request from the requester to access the one or more ephemeral roles within the machine learning model generated at step S502.

At step S506, a model execution module may determine the requester's group or role membership status within an organization; and may dynamically evaluate the received request with the machine learning model in real time to grant or deny access to one or more ephemeral roles based on the membership status.

At step S508, a model update module may dynamically update in real time the machine learning model generated by the model generation module after granting or denying access to one or more ephemeral roles executed by the model execution module.

At step S510, the model generated by the model generation module may be updated. For example, the DMLMEM 403 may send an electronic notification via a communication module to a manager's computing device when an access to one or more ephemeral roles has been denied by the model execution module. The DMLMEM 403 may automatically receive via the communication module approval or disapproval from a manager who is utilizing a manager's computing device whether to grant access to one or more ephemeral roles. The model update module may update the machine learning model generated by the model generation module to incorporate data related to manager's approval or disapproval. The updated model may be stored in a usage server. According to exemplary embodiments, electronic notification may be in the form of e-mail, SMS, etc., but the disclosure is not limited thereto.

Figure 6:
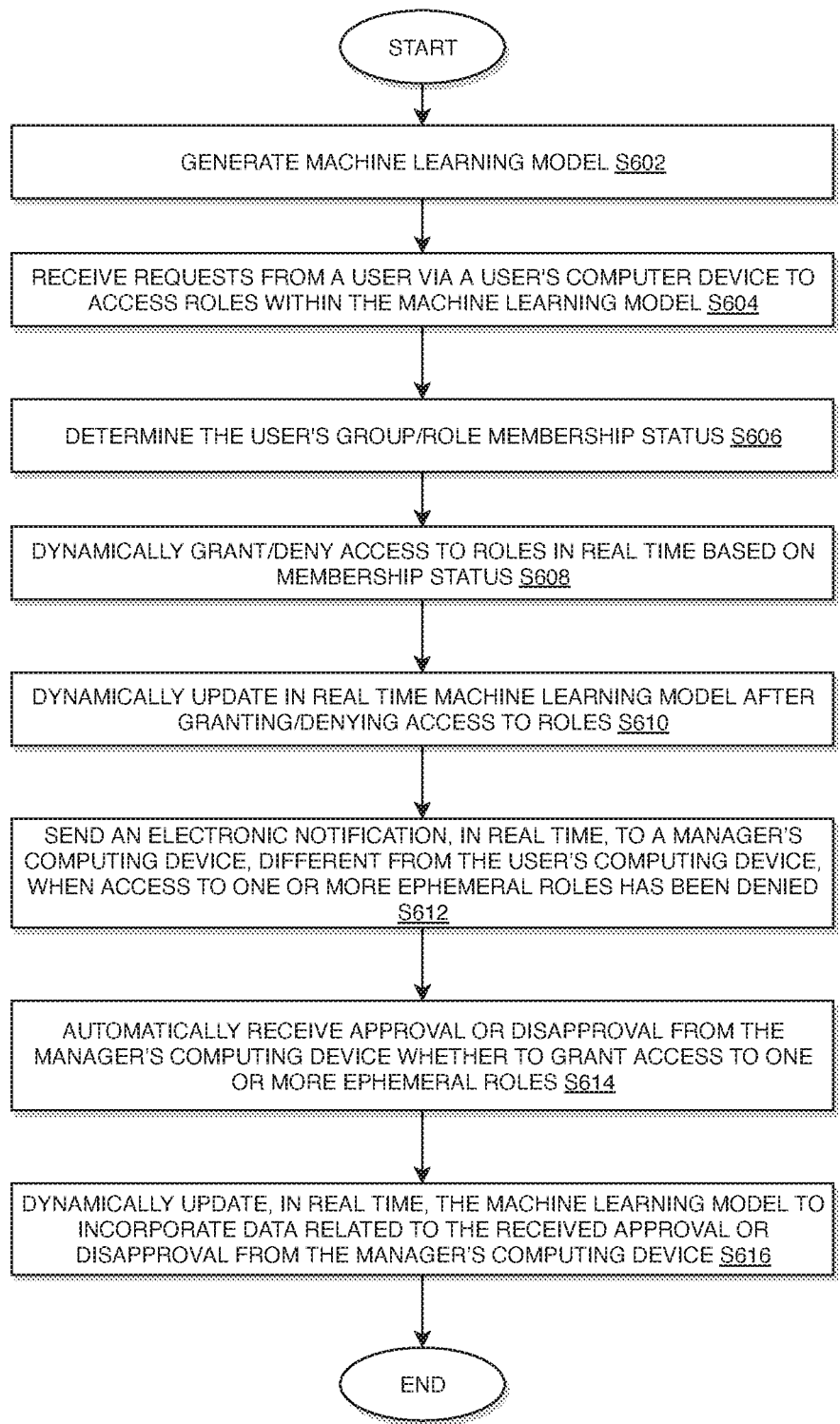
FIG. 6 illustrates a flowchart of an exemplary process for implementing a dynamic machine learning model execution module in accordance with an exemplary embodiment.

For example, FIG. 6 illustrates a flowchart of an exemplary process for implementing a dynamic machine learning model execution module in accordance with an exemplary embodiment where such denial of access has been considered. The dynamic machine learning model execution module may be the DMLMEM 202 as illustrated in FIG. 2 or the DMLMEM 403 as illustrated in FIG. 4.

In the process 600 of FIG. 6, a machine learning model may be generated by a model generation module at step S602. The machine learning model may include data related to a requester's access to one or more ephemeral roles.

At step S604, the DMLMEM 403 may receive a request from the requester via a requester's computing device to access the one or more ephemeral roles within the machine learning model generated at step S602. According to exemplary embodiments, the requester's computing device may be the same or similar to the requester computing device 401 as illustrated in FIG. 4, but the disclosure is not limited thereto.

At step S606, a model execution module may determine the requester's group or role membership status within an organization; and may dynamically evaluate the received request with the machine learning model in real time to grant or deny access to one or more ephemeral roles based on the membership status. According to exemplary embodiments, the model execution module may be the same or similar to the model execution module 409 as illustrated in FIG. 4, but the disclosure is not limited thereto.

At step S608, a model update module may dynamically update in real time the machine learning model generated by the model generation module after granting or denying access to one or more ephemeral roles executed by the model execution module. According to exemplary embodiments, the model update module may be the same or similar to the model update module 411 as illustrated in FIG. 4, but the disclosure is not limited thereto.

At step S610, the model generated by the model generation module may dynamically update the machine learning model after granting or denying access to the one or more ephemeral roles. The updated model may be stored in a usage server. According to exemplary embodiments, the usage server may be the same or similar to the usage server 417 as illustrated in FIG. 4, but the disclosure is not limited thereto.

Sometimes access to a requested role may be denied by the DMLMEM 403. The process 600 of the instant disclosure may further include the following steps to address such issue.

For example, at step S610, the DMLMEM 403 may dynamically send an electronic notification, in real time, to a manager's computing device when access to one or more ephemeral roles has been denied. At step S614, the DMLMEM 403 may automatically receive approval or disapproval from the manager's computing device whether to grant access to one or more ephemeral roles. At step S616, the DMLMEM 403 may dynamically update the machine learning model to incorporate data related to received manager's approval or disapproval from the manager's computing device.

According to exemplary embodiments, the ephemeral roles may not include any statically assigned set of permissions, and the process 600 may further include: applying a predefined algorithm to dynamically determine access control at the time of request in real time to grant or deny access to a role requested by the requester.

According to exemplary embodiments, the process 600 may further include: dynamically determining, in real time, whether access should be granted based on one or more of the following factors: who created the roles, other's usage of the roles, an organization's reporting lines or project codes or tags, sensitivity of the data being requested, and whether any hints have been provided.

According to exemplary embodiments, the process 600 may further include: dynamically determining, in real time, whether access should be granted based on determining whether data requested by the requester conforms with a predefined classification scheme applied on the data.

According to exemplary embodiments, the process 600 may further include: dynamically determining, in real time, whether access should be granted based on contextual identity of a requester.

According to exemplary embodiments as disclosed above in FIGS. 1-6, technical improvements effected by the instant disclosure may include platforms for implementing a dynamic machine learning model execution module for dynamically granting access to ephemeral roles in real time to significantly reduce processing time. The various aspects, embodiments, features, and/or sub-components disclosed herein with respect to FIGS. 1-6 may provide optimized processes of implementing a dynamic machine learning model execution module in which the dynamic machine learning model execution module may dynamically determine, in real time, if access to roles should be granted at the time of request, thereby eliminating the conventional need of generating statically assigned set of permissions and eliminating the need of recertification processes, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a machine learning model execution module for granting access to ephemeral roles, the method comprising:
   generating, by a processor, a machine learning model, the machine learning model including data related to a requester's access to one or more ephemeral roles;
   receiving, by the processor, a request from a requester's computing device to access the one or more ephemeral roles within the machine learning model;
   determining, by the processor, the requester's group or role membership status within an organization; and
   dynamically evaluating, by the processor, the received request with the machine learning model in real time to grant or deny access to one or more ephemeral roles based on the membership status of the requester,
   wherein ephemeral roles include no statically assigned set of permissions, and the method further comprising:
   applying a predefined algorithm to dynamically determine access control at the time of request in real time to grant or deny access to a role requested by the requester.

2. The method according to claim 1, further comprising:
   dynamically updating the machine learning model after granting or denying access to one or more ephemeral roles.

3. The method according to claim 1, further comprising:
   sending an electronic notification, by the processor, to a manager's computing device, different from the requester's computing device, when access to one or more ephemeral roles has been denied;
   automatically receiving, by the processor, approval or disapproval from the manager's computing device whether to grant access to one or more ephemeral roles; and
   updating, by the processor, the machine learning model to incorporate data related to the received approval or disapproval from the manager's computing device.

4. The method according to claim 1, further comprising:
   dynamically determining whether access should be granted based on one or more of the following factors: who created the roles, other's usage of the roles, an organization's reporting lines or project codes or tags, sensitivity of the data being requested, and whether any hints have been provided.

5. The method according to claim 1, further comprising:
   dynamically determining whether access should be granted based on determining whether data requested by the requester conforms with a predefined classification scheme applied on the data.

6. The method according to claim 1, further comprising:
   dynamically determining whether access should be granted based on contextual identity of a requester.

7. A system for implementing a machine learning model execution module for granting access to ephemeral roles, the system comprising:
   a memory; and
   a processor operatively connected to the memory via a communication network,
   wherein the processor is configured to:
   generate a machine learning model, the machine learning model including data related to a requester's access to one or more ephemeral roles;

receive a request from a requester's computing device to access the one or more ephemeral roles within the machine learning model;

determine the requester's group or role membership status within an organization; and dynamically evaluate the received request with the machine learning model in real time to grant or deny access to one or more ephemeral roles based on the membership status of the requester, wherein ephemeral roles include no statically assigned set of permissions, and wherein the processor is further configured to:

apply a predefined algorithm to dynamically determine access control at the time of request in real time to grant or deny access to a role requested by the requester.

8. The system according to claim 7, wherein the processor is further configured to:

dynamically update the machine learning model after granting or denying access to one or more ephemeral roles.

9. The system according to claim 7, wherein the processor is further configured to:

send an electronic notification to a manager's computing device, different from the requester's computing device, when access to one or more ephemeral roles has been denied;

automatically receive approval or disapproval from the manager's computing device whether to grant access to one or more ephemeral roles; and update the machine learning model to incorporate data related to the received approval or disapproval from the manager's computing device.

10. The system according to claim 7, wherein the processor is further configured to:

dynamically determine whether access should be granted based on one or more of the following factors: who created the roles, other's usage of the roles, an organization's reporting lines or project codes or tags, sensitivity of the data being requested, and whether any hints have been provided.

11. The system according to claim 7, wherein the processor is further configured to:

dynamically determine whether access should be granted based on determining whether data requested by the requester conforms with a predefined classification scheme applied on the data.

12. The system according to claim 7, wherein the processor is further configured to:

dynamically determine whether access should be granted based on contextual identity of a requester.

13. A non-transitory computer readable medium configured to store instructions for implementing a machine learning model execution module for granting access to ephemeral roles, wherein when executed, the instructions cause a processor to perform the following:

generate a machine learning model, the machine learning model including data related to a requester's access to one or more ephemeral roles;

receive a request from a requester's computing device to access the one or more ephemeral roles within the machine learning model;

determine the requester's group or role membership status within an organization; and dynamically evaluate the received request with the machine learning model in real time to grant or deny access to one or more ephemeral roles based on the membership status of the requester, wherein when executed, the instructions further cause the processor to perform the following:

apply a predefined algorithm to dynamically determine access control at the time of request in real time to grant or deny access to a role requested by the requester.

14. The non-transitory computer readable medium according to claim 13, wherein when executed, the instructions further cause the processor to perform the following:

dynamically update the machine learning model after granting or denying access to one or more ephemeral roles.

15. The non-transitory computer readable medium according to claim 13, wherein when executed, the instructions further cause the processor to perform the following:

send an electronic notification to a manager's computing device, different from the requester's computing device, when access to one or more ephemeral roles has been denied;

automatically receive approval or disapproval from the manager's computing device whether to grant access to one or more ephemeral roles; and update the machine learning model to incorporate data related to the received approval or disapproval from the manager's computing device.

16. The non-transitory computer readable medium according to claim 13, wherein when executed, the instructions further cause the processor to perform the following:

dynamically determine whether access should be granted based on one or more of the following factors: who created the roles, other's usage of the roles, an organization's reporting lines or project codes or tags, sensitivity of the data being requested, and whether any hints have been provided.

17. The non-transitory computer readable medium according to claim 13, wherein when executed, the instructions further cause the processor to perform the following:

dynamically determine whether access should be granted based on determining whether data requested by the requester conforms with a predefined classification scheme applied on the data.

* * * * *